US012244064B2

(12) United States Patent
Kusukame et al.

(10) Patent No.: US 12,244,064 B2
(45) Date of Patent: Mar. 4, 2025

(54) ANTENNA DEVICE WITH A MAGNETIC BODY

(71) Applicant: TOYOTA JIDOSHA KABUSHIKI KAISHA, Toyota (JP)

(72) Inventors: Taiki Kusukame, Tomioka (JP); Takeshi Sampo, Tomioka (JP); Takayuki Sone, Tomioka (JP); Masaki Tsukamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 16/622,552

(22) PCT Filed: Mar. 22, 2018

(86) PCT No.: PCT/JP2018/011381
§ 371 (c)(1),
(2) Date: Dec. 13, 2019

(87) PCT Pub. No.: WO2018/230073
PCT Pub. Date: Dec. 20, 2018

(65) Prior Publication Data

US 2021/0151896 A1 May 20, 2021

(30) Foreign Application Priority Data

Jun. 14, 2017 (JP) ................................ 2017-117005

(51) Int. Cl.
*H01Q 17/00* (2006.01)
*H01Q 1/48* (2006.01)
(Continued)

(52) U.S. Cl.
CPC ............ *H01Q 17/007* (2013.01); *H01Q 1/48* (2013.01); *H01Q 1/528* (2013.01); *H01Q 9/30* (2013.01); *H01Q 17/001* (2013.01); *H01Q 1/325* (2013.01)

(58) Field of Classification Search
CPC ........ H01Q 17/007; H01Q 1/528; H01Q 9/30; H01Q 17/001; H01Q 1/48; H01Q 1/325; H01Q 1/38
See application file for complete search history.

(56) References Cited

U.S. PATENT DOCUMENTS

2003/0020657 A1* 1/2003 Sakamoto ........... H01Q 1/3291 343/700 MS
2004/0169606 A1* 9/2004 Sato .................... H01Q 9/0421 343/702

(Continued)

FOREIGN PATENT DOCUMENTS

CN 1770817 A 5/2006
CN 101682114 A 3/2010

(Continued)

OTHER PUBLICATIONS

Feb. 4, 2021 Search Report issued in European Patent Application No. 18818371.9.

(Continued)

*Primary Examiner* — Hoang V Nguyen
*Assistant Examiner* — Yonchan J Kim
(74) *Attorney, Agent, or Firm* — Oliff PLC

(57) ABSTRACT

An antenna device mounted on a base plate includes an antenna element. The antenna device further includes a base composed of metal, the base being mounted on the antenna device with the antenna element. The antenna device further includes a magnetic body configured to be disposed between the base and the base plate.

6 Claims, 6 Drawing Sheets

(51) Int. Cl.

| | |
|---|---|
| ***H01Q 1/52*** | (2006.01) |
| ***H01Q 9/30*** | (2006.01) |
| *H01Q 1/32* | (2006.01) |

(56) References Cited

U.S. PATENT DOCUMENTS

| | | | | |
|---|---|---|---|---|
| 2006/0109178 | A1 | 5/2006 | Takeuchi et al. | |
| 2007/0273600 | A1 | 11/2007 | Tsujimura et al. | |
| 2009/0167623 | A1 | 7/2009 | Tsujimura et al. | |
| 2010/0035539 | A1 | 2/2010 | Yoshida et al. | |
| 2010/0171667 | A1* | 7/2010 | Knudsen | H01Q 9/0407 343/702 |
| 2010/0231482 | A1 | 9/2010 | Yoshida et al. | |
| 2010/0245049 | A1 | 9/2010 | Yoshida et al. | |
| 2011/0124299 | A1 | 5/2011 | Koujima et al. | |
| 2012/0154235 | A1* | 6/2012 | Nakamura | H01Q 9/0428 343/787 |
| 2012/0287002 | A1* | 11/2012 | Parsche | H01Q 9/0435 343/702 |
| 2013/0194147 | A1 | 8/2013 | Yoshioka | |
| 2014/0224885 | A1 | 8/2014 | Yoshida et al. | |
| 2017/0214112 | A1 | 7/2017 | Ohno et al. | |
| 2020/0313301 | A1* | 10/2020 | Hamabe | H01Q 15/14 |

FOREIGN PATENT DOCUMENTS

| | | | | |
|---|---|---|---|---|
| CN | 102017302 | A | 4/2011 | |
| DE | 102008039125 | A1 | 3/2010 | |
| DE | 102013201222 | A1 | 8/2013 | |
| GB | 2411524 | A | 8/2005 | |
| JP | 2003-110351 | A | 4/2003 | |
| JP | 2008-021990 | A | 1/2008 | |
| JP | 4896705 | B2 | 3/2012 | |
| JP | 2016-032166 | A | 3/2016 | |
| WO | WO-2010020327 | A1 * | 2/2010 | H01Q 1/1271 |
| WO | 2011/024607 | A1 | 3/2011 | |

OTHER PUBLICATIONS

TDK; "Noise Suppression Sheets Flexield IFL Series"; Nov. 2015; pp. 1-8; <https://ferrite.ru/uploads/pdf/products/tdk/magnetic%20sheets/emc_noise-sheet_ifl_en.pdf>.

Aug. 17, 2020 Office Action issued in Chinese Patent Application No. 201880039219.9.

Oct. 14, 2022 Office Action issued in European Patent Application No. 18818371.9.

Lyndon B.; "Modified Coaxial Probe Feeds for Layered Antennas—Tech Briefs;" Tech Briefs Engineering Solutions for Design & Manufacturing; Nov. 1, 2006; URL:https://www.techbriefs.com/component/content/article/tb/pub/briefs/electronics-and-computers/111.

* cited by examiner

ANTENNA DEVICE WITH A MAGNETIC BODY

TECHNICAL FIELD

The present disclosure relates to an antenna device mounted on a base plate such as a vehicle body.

BACKGROUND ART

Patent Literature 1 discloses an antenna device mounted on a vehicle. In the antenna device, a conductor plate electrically connected to a metal base is brought into contact with a vehicle body roof, which is an example of a base plate. According to this configuration, unnecessary resonance caused by the metal base having a resonance point corresponding to a distance to the vehicle body roof is prevented from occurring in a required frequency band.

CITATION LIST

Patent Literature

Patent Literature 1: Japanese Patent Application Publication No. 2016-32166

SUMMARY OF INVENTION

Problem to be Solved

In the antenna device described in Patent Literature 1, although the unnecessary resonance is shifted out of the required frequency band, the occurrence of unnecessary resonance itself cannot be reduced.

An object of the present disclosure is to provide an antenna device capable of reducing occurrence of unnecessary resonance.

Means for Solving the Problem

According to an aspect of the present invention for achieving the above object, there is provided an antenna device mounted on a base plate. The antenna device includes:

an antenna element;

a base mounted thereon with the antenna element; and a magnetic body disposed between the base and the base plate.

The magnetic body may be disposed between a glass provided so as to cover at least a part of the base plate and the base.

A thickness of the magnetic body in an upward-downward direction may be 0.1 mm or more, and an imaginary part of a magnetic permeability of the magnetic body may be 10 or more.

The thickness of the magnetic body in the upward-downward direction may be 0.3 mm or more, and the imaginary part of the magnetic permeability of the magnetic body may be 5.5 or more.

DETAILED DESCRIPTION OF EMBODIMENTS

Figure 1:
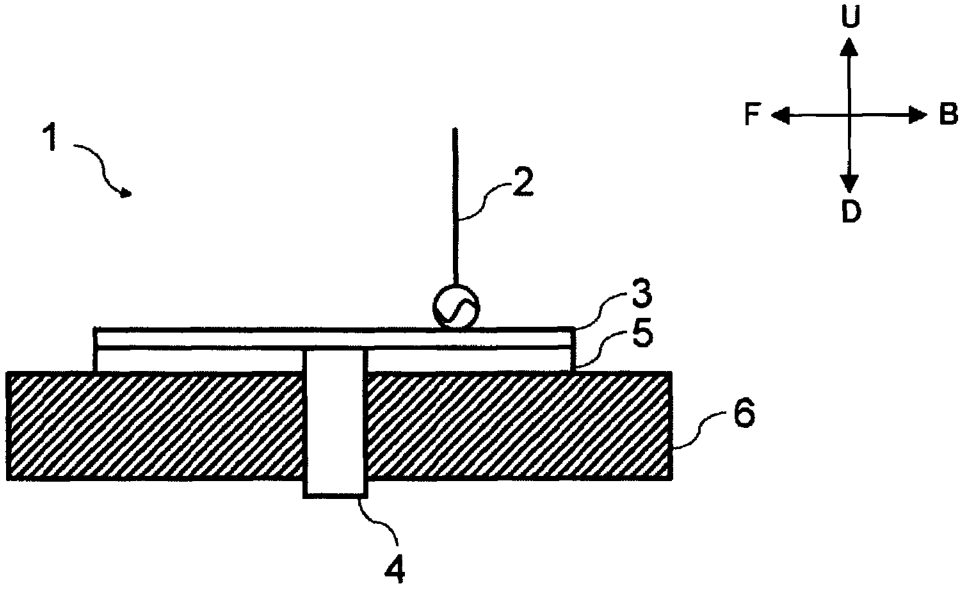
FIG. 1 is a sectional view schematically showing an antenna device according to a first embodiment.

Hereinafter, embodiments will be described in detail with reference to the drawings. The same or equivalent components, members, or the like illustrated in the drawings are denoted by the same reference numerals, and a repetitive description thereof will be omitted.

In the accompanying drawings, an arrow F indicates a forward direction of the illustrated structure. An arrow B indicates a backward direction of the illustrated structure. An arrow U indicates an upward direction of the illustrated structure. An arrow D indicates a downward direction of the illustrated structure. These expressions relating to these directions are merely used for convenience of description, and are not intended to limit a posture of an antenna device when the antenna device is used.

First Embodiment

FIG. 1 is a sectional view schematically showing an antenna device 1 according to a first embodiment. The antenna device 1 is configured to be mounted on a vehicle. Specifically, the antenna device 1 is configured to be mounted on a base plate 6 such as a vehicle body roof.

The antenna device 1 includes an antenna element 2, a base 3, a power supply cylindrical portion 4, and a magnetic body 5. In FIG. 1, illustrations of a substrate and an electronic component or the like disposed on an exterior case or the base 3 are omitted.

In the example, the antenna element 2 is a telematics (TEL) antenna. The antenna element 2 is mounted on the base 3 made of metal.

The power supply cylindrical portion 4 extends downward from the base 3. The power supply cylindrical portion 4 is electrically connected to the base plate 6 on a vehicle body side. The power supply cylindrical portion 4 may be a metal component integral with the base 3, or may be a separate metal component electrically connected to the base 3.

The magnetic body 5 is a magnetic body sheet. The magnetic body 5 is provided on a lower surface of the base 3. The magnetic body 5 is fixed to the lower surface of the base 3 by adhesion or the like. The magnetic body 5 is disposed so as to be interposed between the base 3 and the base plate 6. The magnetic body 5 may be provided on the entire lower surface of the base 3, or may be provided on a part of the lower surface. In a case where the magnetic body 5 is provided on a part of the lower surface of the base 3, it is preferable that the magnetic body 5 be disposed at least around the power supply cylindrical portion 4. From a viewpoint of dimensional accuracy, occurrence of a gap between the base 3 and the base plate 6 cannot be avoided, and the magnetic body 5 is provided so as to fill the gap.

Figure 2:
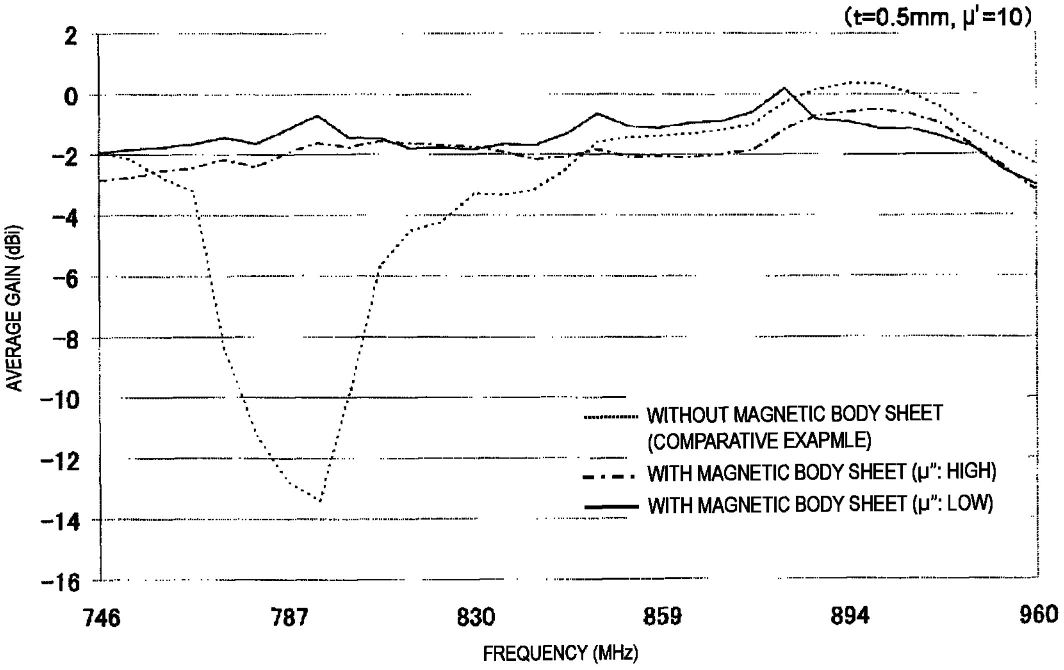
FIG. 2 is a frequency characteristic diagram of an average gain obtained by actual measurement, for explaining an effect of a magnetic body in the antenna device.

FIG. 2 is a frequency characteristic diagram of an average gain obtained by actual measurement, for explaining an effect of the magnetic body in the antenna device 1. FIG. 2 shows characteristics of the antenna device 1 having the magnetic body 5 with a high imaginary part μ" of a magnetic permeability, the antenna device 1 having the magnetic body 5 with a low imaginary part μ" of the magnetic permeability, and an antenna device in a comparative example in which the magnetic body 5 is removed from the antenna device 1.

Figure 3:
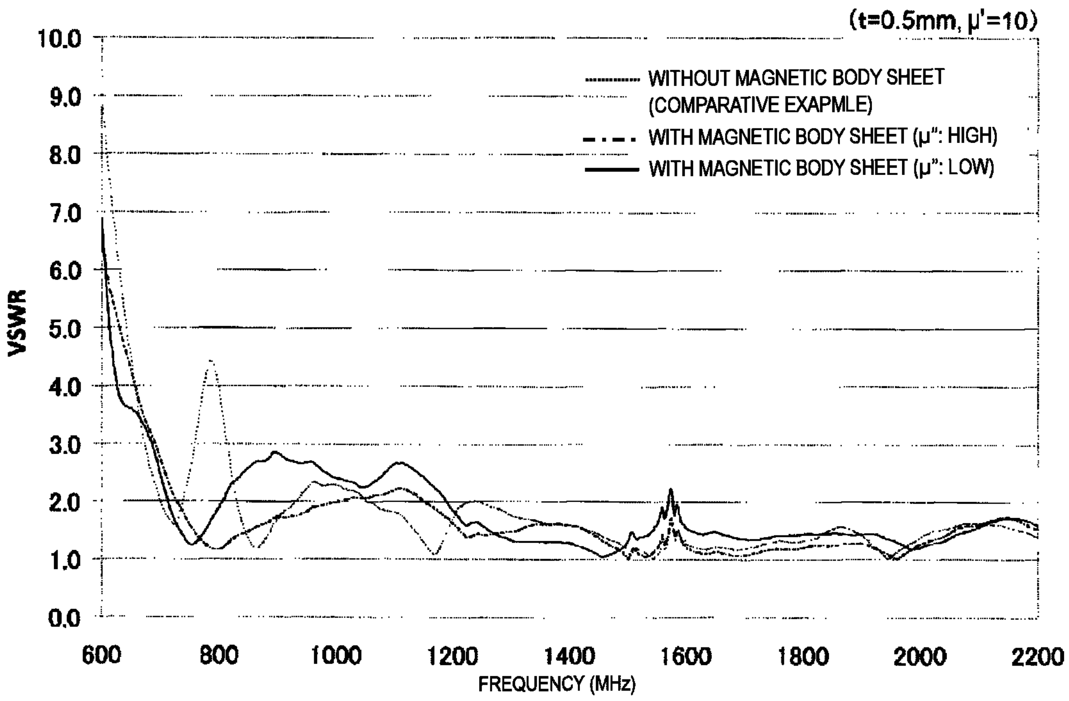
FIG. 3 is a frequency characteristic diagram of a VSWR obtained by the actual measurement, for explaining the effect of the magnetic body in the antenna device.

FIG. 3 is a frequency characteristic diagram of a VSWR obtained by the actual measurement, for explaining the effect of the magnetic body in the antenna device 1. FIG. 3 shows characteristics of the antenna device 1 having the magnetic body 5 with the high imaginary part μ" of the magnetic permeability, the antenna device 1 having the magnetic body 5 with the low imaginary part μ" of the magnetic permeability, and the antenna device in the comparative example in which the magnetic body 5 is removed from the antenna device 1.

In the antenna device 1 shown in FIGS. 2 and 3, a magnetic body sheet having a thickness t of 0.5 mm in an upward-downward direction is used as the magnetic body 5. A value of a real part μ' of the magnetic permeability of the magnetic body 5 is μ'=10 in any of the antenna device 1. The value of the imaginary part μ" of the magnetic permeability of the magnetic body 5 is one of μ"=20 (μ" is high) and μ"=10 (μ" is low). As shown in FIGS. 2 and 3, by providing the magnetic body 5, the antenna device 1 can reduce unnecessary resonance from occurring as compared with the case where the magnetic body 5 is not provided, regardless of the value of the imaginary part μ" of the magnetic permeability of the magnetic body 5.

Figure 4:
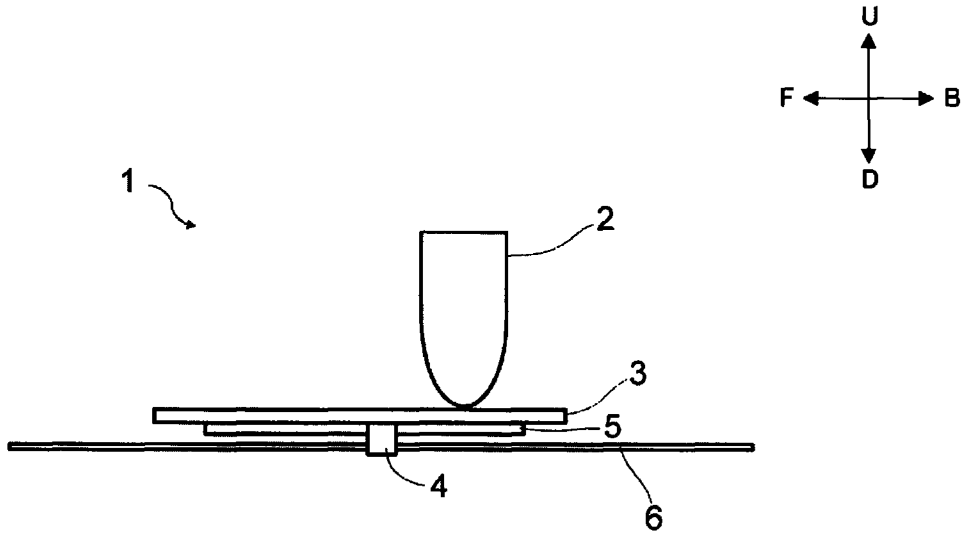
FIG. 4 is a view schematically showing a configuration of the antenna device used for a simulation shown in FIGS. 5 to 8.

FIG. 4 is a view schematically showing a configuration of the antenna device 1 used for a simulation shown in FIGS. 5 to 8. The base 3 whose lower surface is provided with the magnetic body 5 is disposed above the base plate 6 with a gap therebetween. A distance between the base 3 and the base plate 6 is 1 mm. The antenna element 2 is erected on the base 3. The base 3 and the base plate 6 are electrically connected to each other by the power supply cylindrical portion 4.

Figure 5:
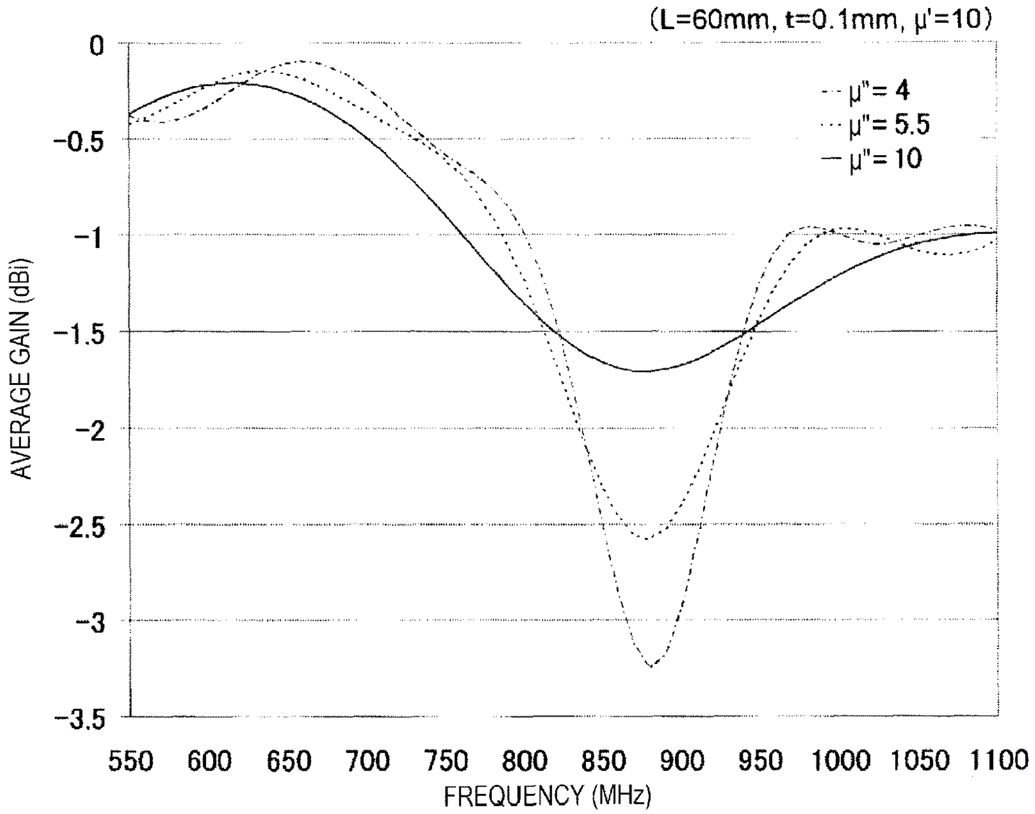
FIG. 5 is a frequency characteristic diagram of an average gain obtained by the simulation of the antenna device, in a case where a value of an imaginary part μ" of a magnetic permeability of the magnetic body is changed.

FIG. 5 is a frequency characteristic diagram of an average gain obtained by the simulation of the antenna device 1, in a case where the value of the imaginary part μ" of the magnetic permeability of the magnetic body 5 is changed. In each case, a length L of the magnetic body 5 in the forward-backward direction is 60 mm. The thickness t of the magnetic body 5 is 0.1 mm. The value of the real part μ' of the magnetic permeability of the magnetic body 5 is μ'=10. The value of the imaginary part μ" of the magnetic permeability of the magnetic body 5 is shown in cases of μ"=4, μ"=5.5, and μ"=10.

As is apparent from FIG. 5, in the case where the thickness t of the magnetic body 5 is 0.1 mm, there is no large difference in the average gain at any μ" except at the frequency of 800 MHz to 950 MHz. On the other hand, when the frequency is 800 MHz to 950 MHz, the average gain is greatly improved in the case of μ"=10 than in the case of μ"=4 or μ"=5.5. Therefore, in the case where the thickness t of the magnetic body 5 is 0.1 mm, it is preferable that the imaginary part μ" of the magnetic permeability be 10 or more. If the thickness t of the magnetic body 5 is larger than 0.1 mm, the unnecessary resonance is further reduced, and the average gain is further improved. Such an example will be described with reference to FIG. 6.

Figure 6:
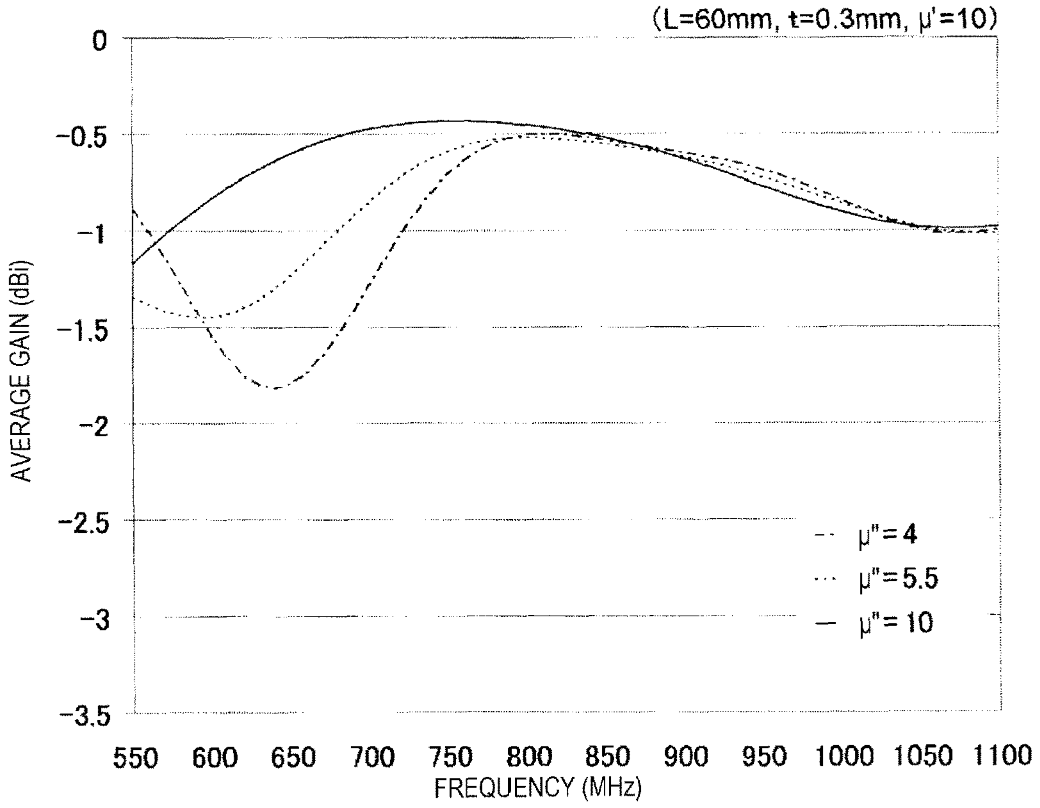
FIG. 6 is a frequency characteristic diagram of the average gain obtained by the simulation of the antenna device, in a case where the value of the imaginary part μ" of the magnetic permeability of a magnetic body thicker than the example of FIG. 5 is changed.

FIG. 6 is a frequency characteristic diagram of the average gain obtained by the simulation of the antenna device 1, in a case where the value of the imaginary part μ" of the magnetic permeability of the magnetic body 5 having the thickness t of 0.3 mm is changed. In each case, the length L of the magnetic body 5 in the forward-backward direction is 60 mm. The value of the real part μ' of the magnetic permeability of the magnetic body 5 is μ'=10. The value of the imaginary part μ" of the magnetic permeability of the magnetic body 5 is shown in the cases of μ"=4, μ"=5.5, and μ"=10.

As is apparent from FIG. 6, in the case where the thickness t of the magnetic body 5 is 0.3 mm, there is no large difference in the average gain at any μ" except at the frequency of 600 MHz to 700 MHz. On the other hand, when the frequency is 600 MHz to 700 MHz, the average gain is greatly improved in the case of μ"=5.5 or μ"=10 than in the case of μ"=4. Therefore, in the case where the thickness t of the magnetic body 5 is 0.3 mm, the imaginary part μ" of the magnetic permeability is preferably 5.5 or more. If the thickness t of the magnetic body 5 is larger than 0.3 mm, the unnecessary resonance is further reduced, and the average gain is further improved. Such an example will be described with reference to FIG. 7.

Figure 7:
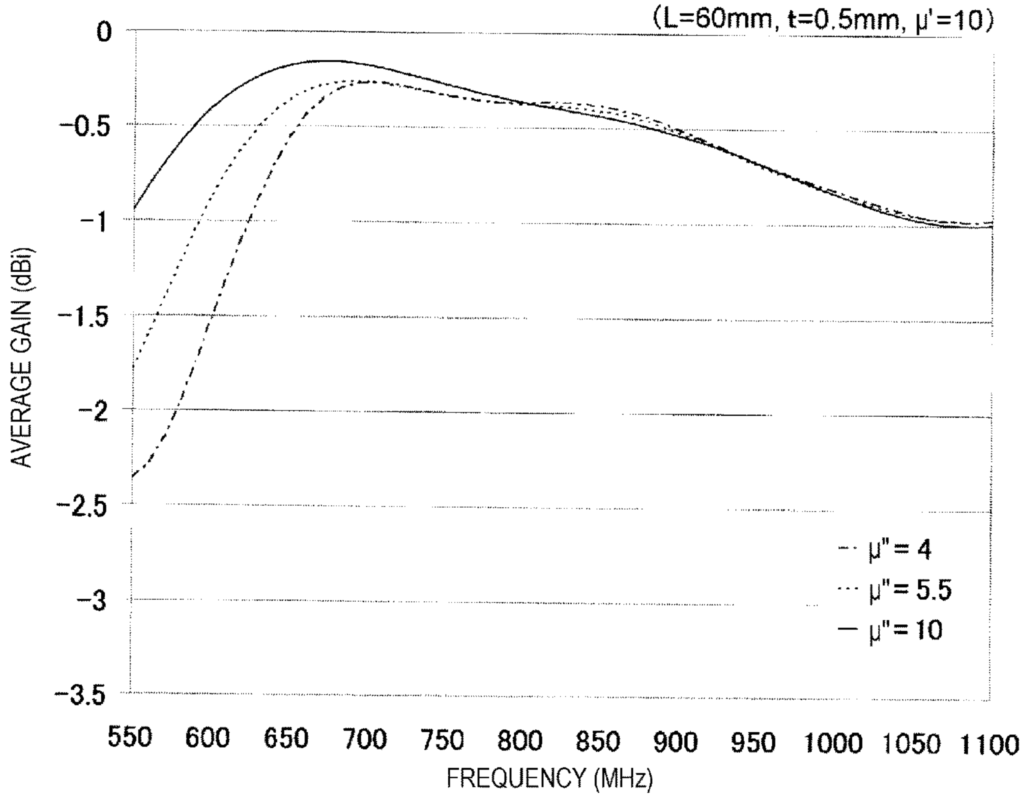
FIG. 7 is a frequency characteristic diagram of the average gain obtained by the simulation of the antenna device, in a case where the value of the imaginary part μ" of the magnetic permeability of a magnetic body thicker than the example of FIG. 6 is changed.

FIG. 7 is a frequency characteristic diagram of the average gain obtained by the simulation of the antenna device 1, in a case where the value of the imaginary part μ" of the magnetic permeability of the magnetic body 5 having the thickness t of 0.5 mm is changed. In each case, the length L of the magnetic body 5 in the forward-backward direction is 60 mm. The value of the real part μ' of the magnetic permeability of the magnetic body 5 is μ'=10. The value of the imaginary part μ" of the magnetic permeability of the magnetic body 5 is shown in the cases of μ"=4, μ"=5.5, and μ"=10.

As is apparent from FIG. 7, in the case where the thickness t of the magnetic body 5 is 0.5 mm, there is no large difference in the average gain at any μ" except at the frequency of 550 MHz to 600 MHz. On the other hand, when the frequency is 550 MHz to 600 MHz, the average gain is greatly improved in the case of μ"=5.5 or μ"=10 than in the case of μ"=4. Therefore, in the case where the thickness t of the magnetic body 5 is 0.5 mm, the imaginary part μ" of the magnetic permeability is preferably 5.5 or more. As a result, if the thickness t of the magnetic body 5 is larger than 0.5 mm, the unnecessary resonance is further reduced, and the average gain is further improved.

Figure 8:
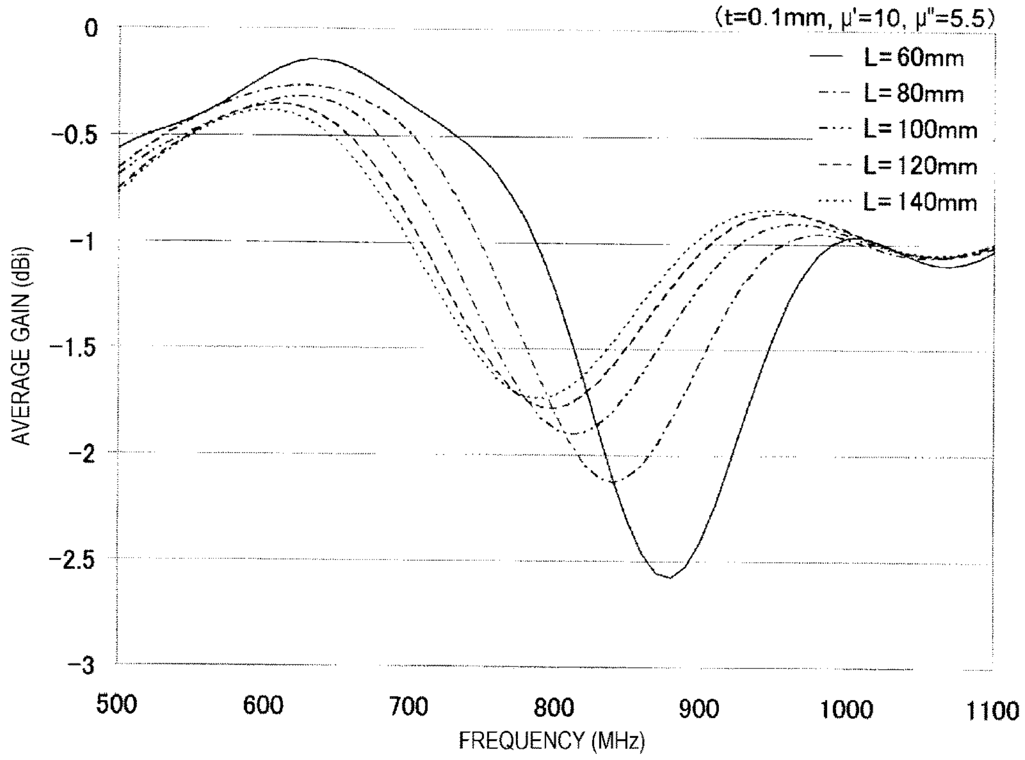
FIG. 8 is a frequency characteristic diagram of the average gain obtained by the simulation of the antenna device, in a case where a length of the magnetic body in a forward-backward direction is changed.

FIG. 8 is a frequency characteristic diagram of the average gain obtained by the simulation of the antenna device 1, in a case where the length of the magnetic body 5 in the forward-backward direction is changed. In each case, the thickness t of the magnetic body 5 is 0.1 mm. The value of the real part μ' of the magnetic permeability of the magnetic body 5 is μ'=10. The value of the imaginary part μ" of the magnetic permeability of the magnetic body 5 is μ"=5.5. The length L of the magnetic body 5 in the forward-backward direction is shown for 60 mm, 80 mm, 100 mm, 120 mm, and 140 mm.

As is apparent from FIG. 8, when the length L of the magnetic body 5 in the forward-backward direction becomes long, the frequency at which the average gain decreases becomes low. Therefore, in order to shift unnecessary resonance out of a required frequency band, it is effective to change the length L of the magnetic body 5 in the forward-backward direction.

Figure 9:
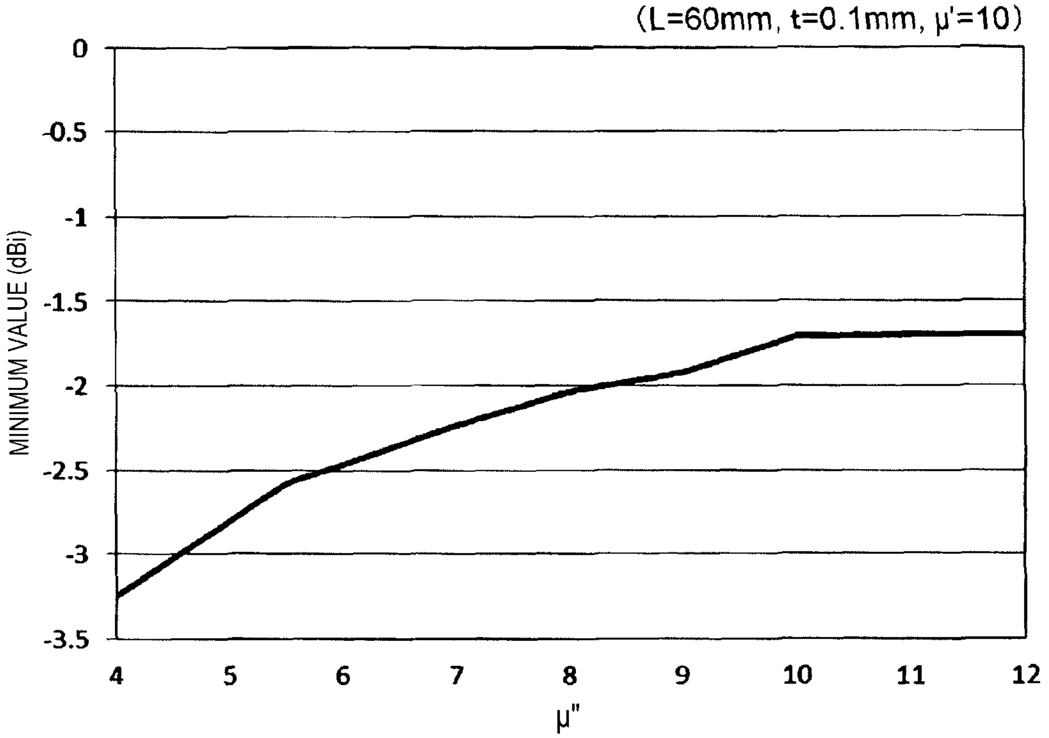
FIG. 9 is a characteristic diagram showing a relationship between the imaginary part μ" of the magnetic permeability and a minimum value of the average gain, obtained by the simulation of the antenna device according to FIG. 5.

FIG. 9 is a characteristic diagram showing a result, in the antenna device 1 according to FIG. 5, of simulating a relationship between the imaginary part μ" of the magnetic permeability and a minimum value of the average gain in a range of the frequency of 550 MHz to 1100 MHz. That is, the length L of the magnetic body 5 in the forward-backward direction is 60 mm. The thickness t of the magnetic body 5 is 0.1 mm. The value of the real part μ' of the magnetic permeability of the magnetic body 5 is μ'=10.

As is apparent from FIG. 9, in a range where μ is 10 or less, the minimum value of the average gain increases as μ" increases. On the other hand, in a range where μ is 10 or more, the minimum value of the average gain tends to converge. In combination with the result of FIG. 5 showing the relationship between the average gain and the frequency under the same conditions, it has been found that a high minimum value of the average gain is obtained by setting the thickness t of the magnetic body 5 to 0.1 mm or more and the imaginary part μ of the magnetic permeability to 10 or more.

Figure 10:
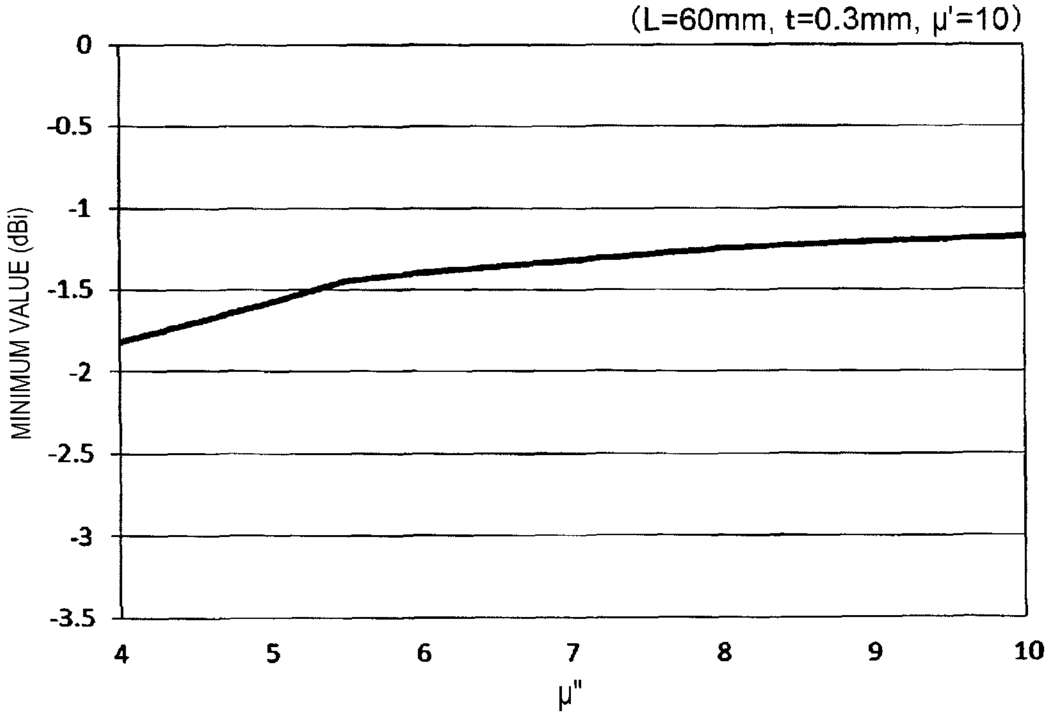
FIG. 10 is a characteristic diagram showing a relationship between the imaginary part μ" of the magnetic permeability and the minimum value of the average gain, obtained by the simulation of the antenna device according to FIG. 6.

FIG. 10 is a characteristic diagram showing a result, in the antenna device 1 according to FIG. 6, of simulating a relationship between the imaginary part μ" of the magnetic permeability and the minimum value of the average gain in the range of the frequency of 550 MHz to 1100 MHz. That is, the length L of the magnetic body 5 in the forward-backward direction is 60 mm. The thickness t of the magnetic body 5 is 0.3 mm. The value of the real part μ' of the magnetic permeability of the magnetic body 5 is μ'=10.

As is apparent from FIG. 10, in a range where μ is 5.5 or less, the minimum value of the average gain increases as μ" increases. On the other hand, when μ" is 5.5 or more, the minimum value of the average gain tends to converge. In combination with the result of FIG. 6 showing the relationship between the average gain and the frequency under the same conditions, it has been found that a high minimum value of the average gain is obtained by setting the thickness t of the magnetic body 5 to 0.3 mm or more and the imaginary part μ" of the magnetic permeability to 5.5 or more.

Also in the case where the thickness t of the magnetic body 5 is t=0.5 mm as in the example shown in FIG. 7, the relationship between the imaginary part μ" of the magnetic permeability and the minimum value of the average gain shows the same tendency.

As described above, the magnetic body 5 is disposed so as to be interposed between the base 3 and the base plate 6, so that the unnecessary resonance can be reduced.

Second Embodiment

Figure 11:
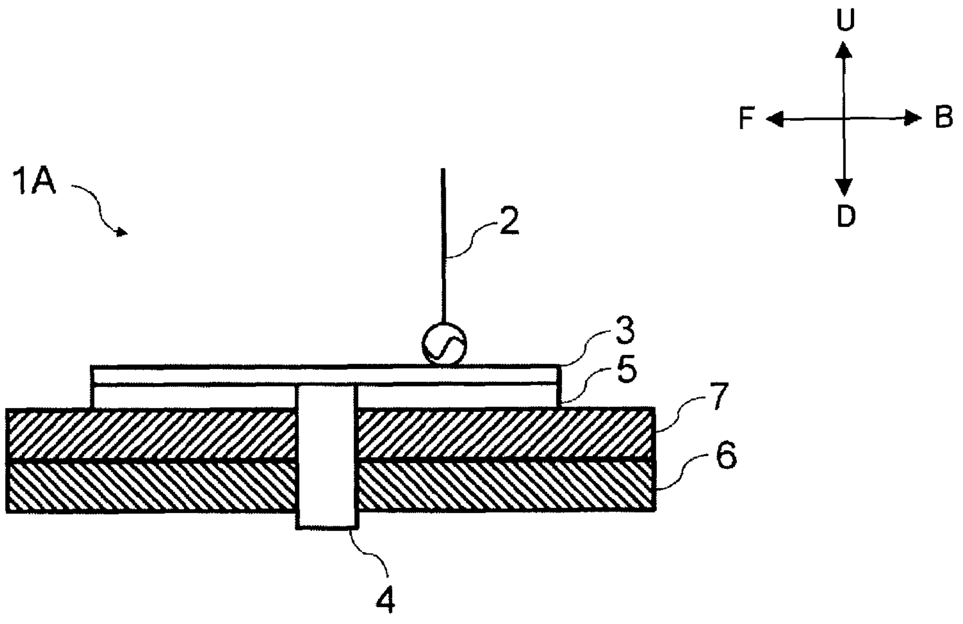
FIG. 11 is a sectional view schematically showing an antenna device according to a second embodiment.

FIG. 11 is a sectional view schematically showing an antenna device 1A according to a second embodiment. The antenna device 1A differs from the configuration of first embodiment in that a glass 7 on the vehicle body side is interposed between the base 3 and the base plate 6, and the magnetic body 5 is interposed between the base 3 and the glass 7. The glass 7 covers at least a part of the base plate 6. The magnetic body 5 is provided so as to fill a gap formed between the base 3 and the glass 7. According to such a configuration, the same effect as that of the antenna device 1 according to the first embodiment can be obtained.

The above embodiments are merely illustrative for ease of understanding of the present disclosure. The configuration according to the above-described embodiments may be modified and improved as appropriate without departing from the inventive concept of the present disclosure.

As a part of the description of the present application, the contents of Japanese Patent Application No. 2017-117005 filed Jun. 14, 2017 is incorporated herein by reference.

The invention claimed is:

1. An antenna device for mounting on a base plate, comprising:

an antenna element;

a base composed of metal, the base being mounted on the antenna device, the antenna element being provided on the base;

a power supply cylindrical portion that includes an end surface that extends from a lower surface of the base;

a glass; and a magnetic body configured to be disposed between the base and the base plate, the magnetic body directly contacting the lower surface of the base, and directly contacting a portion of the glass, the power supply cylindrical portion extending through the magnetic body, and only the magnetic body is disposed between the portion of the glass and a portion of the base.

2. The antenna device according to claim 1, wherein the glass covers at least a part of the base plate.

3. The antenna device according to claim 2, wherein a thickness of the magnetic body in an upward-downward direction is 0.1 mm or more, and an imaginary part of a magnetic permeability of the magnetic body is 10 or more.

4. The antenna device according to claim 2, wherein a thickness of the magnetic body in an upward-downward direction is 0.3 mm or more, and an imaginary part of a magnetic permeability of the magnetic body is 5.5 or more.

5. The antenna device according to claim 1, wherein a thickness of the magnetic body in an upward-downward direction is 0.1 mm or more, and an imaginary part of a magnetic permeability of the magnetic body is 10 or more.

6. The antenna device according to claim 1, wherein a thickness of the magnetic body in an upward-downward direction is 0.3 mm or more, and an imaginary part of a magnetic permeability of the magnetic body is 5.5 or more.

* * * * *